United States Patent [19]

Tateishi et al.

[11] Patent Number: 5,025,434
[45] Date of Patent: Jun. 18, 1991

[54] TRACKING SERVO APPARATUS OF DISK PLAYER

[75] Inventors: Kiyoshi Tateishi; Haruyasu Sakata; Yuji Tawaragi; Masanori Suzuki; Takayuki Ohie, all of Tokorozawa, Japan

[73] Assignee: Pioneer Electronic Corporation, Tokyo, Japan

[21] Appl. No.: 363,134

[22] Filed: Jun. 8, 1989

[30] Foreign Application Priority Data

Jun. 17, 1988 [JP] Japan .................. 63-149785
Oct. 20, 1988 [JP] Japan .................. 63-264961

[51] Int. Cl.$^5$ ............................... G11B 7/09
[52] U.S. Cl. ........................ 369/44.36; 369/44.29; 369/44.13
[58] Field of Search ............... 369/44.34, 44.32, 44, 369/44.27, 44.28, 44.29, 44.13, 44.35, 44.36; 360/70.01, 78.01, 78.06

[56] References Cited

U.S. PATENT DOCUMENTS 4,674,076 6/1987 Hsieh et al. .................. 369/44.29
4,707,817 11/1987 Yoshio ........................ 369/44.32 X
4,748,610 5/1988 Nakata et al. ................ 369/44.32 X
4,890,273 12/1989 Takeuchi et al. ............. 369/44.36
4,914,645 4/1990 Getrever et al. .............. 369/44.13
4,932,013 6/1990 Kojima et al. ................ 360/78.06

Primary Examiner—Roy N. Envall, Jr.
Assistant Examiner—Hindi Nabil
Attorney, Agent, or Firm—Fleit, Jacobson, Cohn, Price, Holman & Stern

[57] ABSTRACT

There is provided a tracking servo apparatus of a disk player comprising: off-track detecting means for detecting that an information reading spot of a pickup does not exist on an information recording track of a disk and for generating an off-track signal; and level control means for increasing an amplitude of a tracking error signal when the off-track signal exists, whereby the stable tracking servo operation can be executed.

6 Claims, 8 Drawing Sheets

FIG. 2
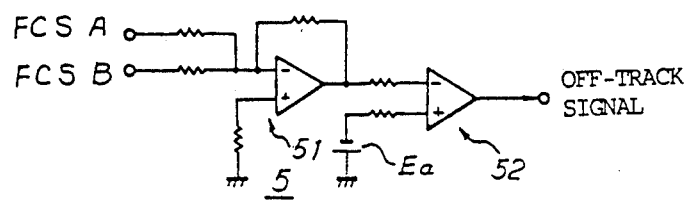
FIG. 3A  TE SIGNAL
FIG. 3B  OFF-TRACK SIGNAL
FIG. 3C  COMPENSATED TE SIGNAL
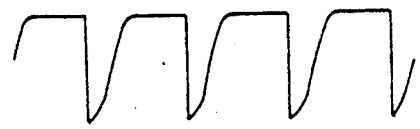
FIG. 3D  COMPENSATED TE SIGNAL
FIG. 3E  COMPENSATED TE SIGNAL
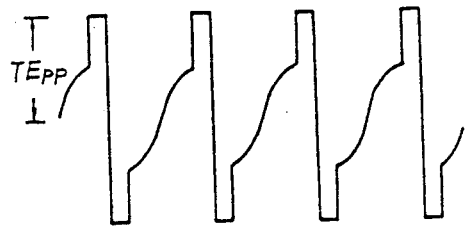

RELATIVE POSITION
BETWEEN TRACK AND BEAM

TE SIGNAL

OFF-TRACK
SIGNAL

COMPENSATED
TE SIGNAL

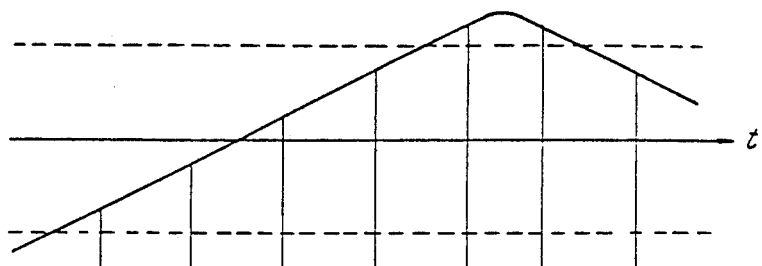
FIG.12A
RELATIVE POSITION BETWEEN THE TRACK AND BEAM
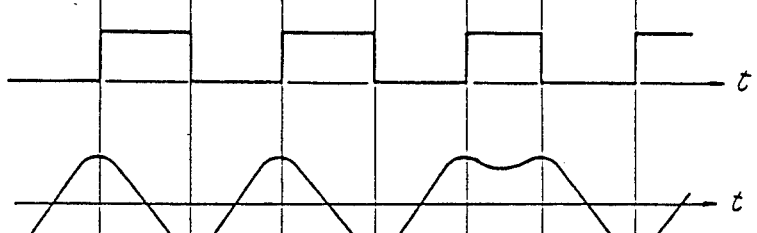
FIG.12B
OFF-TRACK SIGNAL
FIG.12C
TE SIGNAL
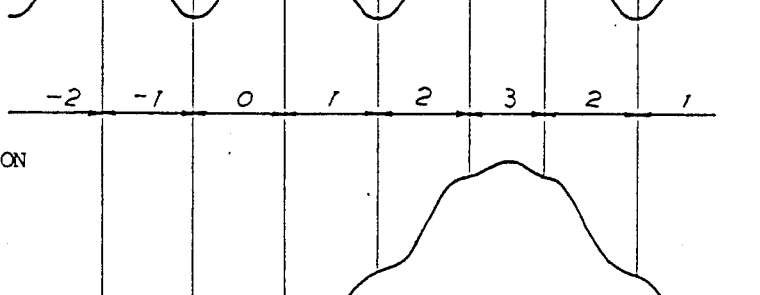
FIG.12D
COUNT VALUE OF POSITION COUNTER
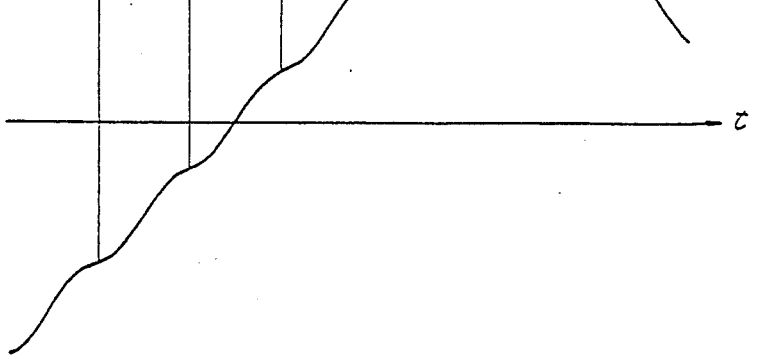
FIG.12E
COMPENSATED TE SIGNAL

TRACKING SERVO APPARATUS OF DISK PLAYER

BACKGROUND OF THE INVENTION

1. Field of the Invention

The present invention relates to a disk player and, more particularly, to a tracking servo apparatus of a disk player.

2. Description of the Prior Art

In a disk player for playing an information recording disk (hereinafter, simply referred to as a disk) such as video disk, digital audio disc, or the like, a tracking servo apparatus is provided to control so as to allow an information reading spot of the pickup to accurately trace a target recording track irrespective of the decentering of the disk or the like.

The tracking servo apparatus performs the position control of the reading spot with respect to the recording track in such a manner that a tracking error signal according to a deviation amount of the information reading spot in the radial direction of the disk from the recording track on the disk is formed and an actuator to shift the information reading point or spot in the disk radial direction is driven in accordance with the tracking error signal. That is, the tracking servo apparatus constructs the so-called closed loop control system. On the other hand, in such a servo apparatus, when executing a jumping operation in which the information reading spot skips a number of recording tracks, the servo loop is opened and a jump pulse is supplied to the actuator and, thereafter, the servo loop is closed at a predetermined timing to thereby execute the servo pull-in operation.

If an obstacle such as a scratch, air bubble, or the like exists on the disk, when a laser beam passes over such an obstacle, an error may result such as a decrease in reflected light amount, loss of focus, or the like occurs. In such a case, if the servo pull-in force is small, the information reading spot is held at a position out of the desired track due to such an obstacle and is not returned to the track but is moved to the preceding track which has already been scanned, and the spot repetitively traces the same track. That is, what is called a groove lock occurs during which the tracking servo does not accurately function.

SUMMARY OF THE INVENTION

It is, therefore, an object of the present invention to provide a tracking servo apparatus in a disk player in which the pull-in force in the tracking servo is increased so as to avoid groove lock.

To accomplish the above object, a tracking servo apparatus is provided in which it is detected whether an information reading spot of a pickup does not exist on a recording track of a disk, and when such a spot is absent, an amplitude of a tracking error signal is increased.

BRIEF DESCRIPTION OF THE DRAWINGS

FIG. 2 is a circuit diagram showing an example of a construction of an off-track circuit;

FIGS. 3A to 3E are waveform diagrams showing a signal waveform in each section in FIG. 1;

FIGS. 12A to 12E are operation waveform diagrams in the circuits shown in FIGS. 10 and 11.

DETAILED DESCRIPTION OF PREFERRED EMBODIMENTS

An embodiment of the present invention will be described hereinbelow with reference to FIG. 1.

Figure 1:
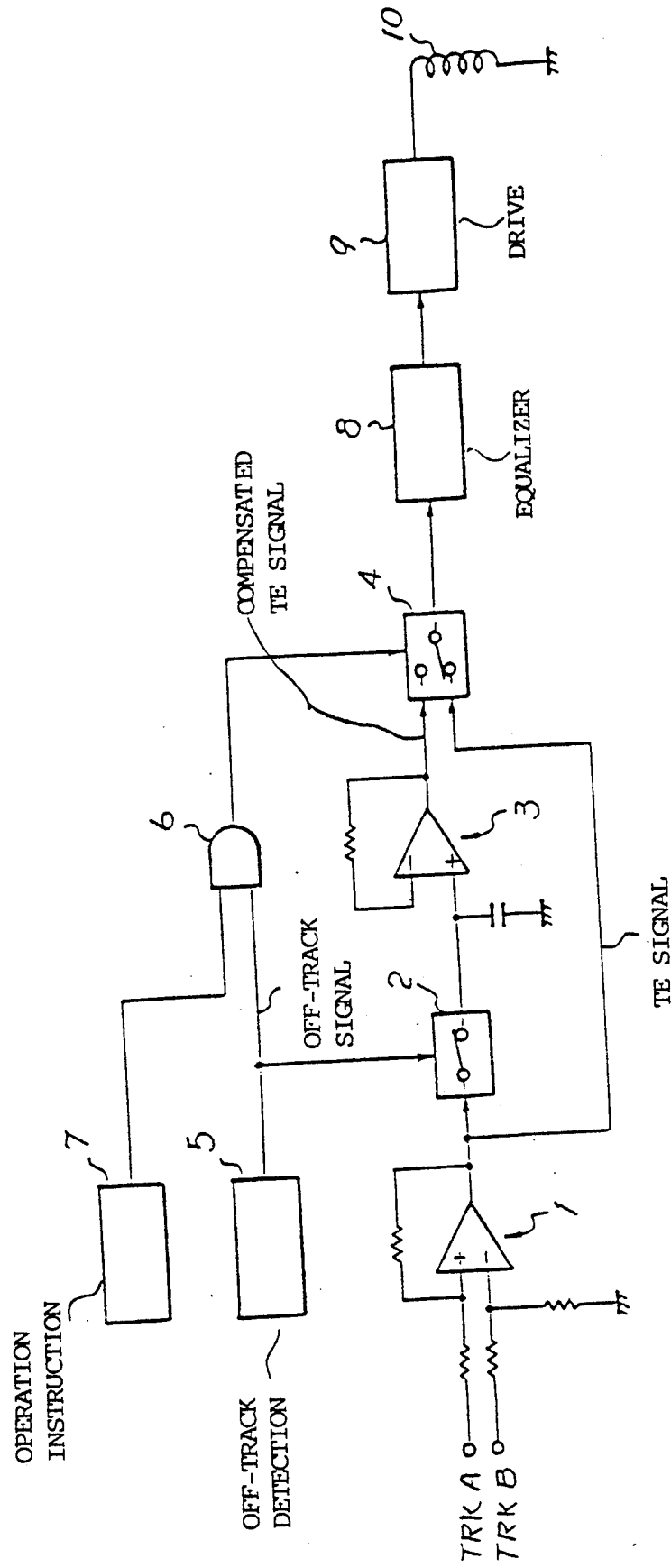
FIG. 1 is a block diagram showing an embodiment of the present invention.

In FIG. 1, a tracking signal A (hereinafter, referred to as a TRKA signal) and a tracking signal B (hereinafter, referred to as a TRKB signal) from first and third photo sensitive devices to detect two tracking beams in a three-beam system (not shown) are subtracted by a subtracter 1, so that a tracking error signal (hereinafter, referred to as a TE signal) as a signal indicative of the difference between the TRKA and TRKB signals is obtained. An example of a circuit to obtain the tracking error signal has been disclosed in detail in JP-A-57-120275. The TE signal is supplied to a sample and hold circuit 3 through a signal relay switch 2 and is directly supplied to one input terminal of a signal selecting switch 4. The switch 2 is switched by an output of an off-track detecting circuit 5. The off-track detecting circuit 5 detects that an information reading spot does not exist on a track, that is, an off-track. For instance, when the information reading spot does not exist on the track, an amount of light reflected from the disk surface increases as compared with that in the case where the spot exists on the track. Therefore, the reflected light amount is photoelectrically converted into the electric signal by a photo sensitive device. When the level of the electric signal is equal to or larger than a predetermined value corresponding to the off-track, the off-track detecting circuit 5 generates a high level off-track signal. If the signal level is lower than the predetermined value, a low level on-track signal is generated.

FIG. 2 shows an example of a construction of the off-track detecting circuit 5. In FIG. 2, there are provided four photo sensitive devices (not shown) having four separated photo sensitive surfaces to detect a reading reflected beam. A focusing signal A as an addition signal of outputs of a pair of photo sensitive devices and a focusing signal B as an addition signal of outputs of another pair of photo sensitive devices are added by an operational amplifier 51. An inverted output is obtained from the operational amplifier 51 and is supplied to a comparison input terminal of a comparator 52. A comparison reference voltage $-E_a$ is applied to a comparison reference input terminal of the comparator 52. When the inverted output level is equal to or lower than the reference level, the comparator 52 outputs the high level off-track signal. When the inverted output level is equal to or higher than the reference level, the comparator 52 outputs the low level on-track signal. The on-track or off-track can be also detected on the basis of the level of an envelope signal of a reading RF signal which is output from a pickup (not shown) or the like.

The off-track signal is supplied to a control input terminal of the signal relay switch 2 and to one input terminal of a logic gate 6. An output of an operation instructing circuit 7 is supplied to the other input terminal of the logic gate 6. When an instruction to enlarge the dynamic range of the tracking error signal is supplied from a keyboard or a control circuit of a player (not shown) to the operation instructing circuit 7, the instructing circuit 7 generates a high level operation instruction signal. When no operation instruction signal is supplied, the logic gate 6 outputs a low level signal. When the operation instruction signal is supplied and the off-track signal is generated, the logic gate 6 outputs a high level signal. The output of the logic gate 6 is used as a switching control signal of the signal selecting switch 4. The logic gate 6 and operation instructing circuit 7 can be also omitted.

The signal relay switch 2 is closed by the low level on-track signal and relays the TE signal to the sample and hold circuit 3. The switch 2 is opened by the high level off-track signal and does not relay the TE signal. Therefore, the sample and hold circuit 3 holds the maximum level of the TE signal just before the off-track occurs. The maximum level signal is supplied to the signal selecting switch 4. When the output of the logic gate 6 is at the low level, that is, when no operation instruction signal is output from the operation instructing circuit 7, or when the tracking state is in the on-track mode during the generation of the operation instruction signal, the switch 4 supplies the TE signal to an equalizing amplifier ,8. When the output of the logic gate 6 is at the high level, that is, in the case of the off-track mode during the generation of the operation instruction signal, the switch 4 supplies the signal of the level held in the sample and hold circuit 3 to the equalizing amplifier 8. Therefore, the switch 4 outputs a compensated TE signal which is set to the inherent Te signal level in the on-track mode and is set to the above holding level which is higher than the TE signal level in the off-track mode. The circuit comprising the components 2 to 4 correspond to level control means.

The equalizing amplifier 8 functions to match the frequency and phase characteristics of the TE signal with the characteristics of a tracking mechanism 10. An output of the equalizing amplifier 8 is amplified by a driving circuit 9 and supplied to the tracking mechanism 10 comprising a tracking actuator and the like, thereby controlling the position of the information reading spot in the radial direction of the disk.

The operation of the circuit with the above construction will now be described with reference to FIG. 3.

First, when no operation instruction signal is generated, the logic gate 6 outputs a low level signal. Therefore, the switch 4 selects the TE signal as shown in, for instance, FIG. 3A and supplies it to the equalizing amplifier 8. FIG. 3A shows a TE signal waveform in the case where a slider to which the pickup is mounted was moved in the disk radial direction. The amplitude of the TE signal is set to 0 when the information reading spot exists at the center of a track or at the center between tracks. The amplitude of the TE signal becomes maximum when the spot exists on the edge of track. On the other hand, for the period of time when the on-track signal is generated, the switch 2 supplies the TE signal to the sample and hold circuit 3. Thus, the instantaneous value of the TE signal just before the on-track signal changes to the off-track signal is held by the sample and hold circuit 3.

When the operation instruction signal is generated, the logic gate 6 relays to the switch 4 the off-track signal as shown in FIG. 3B which has been generated in correspondence to the TE signal shown in FIG. 3A. The switch 4 transmits the TE signal to the equalizing amplifier 8 in the on-track mode. In the off-track mode, the switch 4 transmits the output of the sample and hold circuit 3, that is, almost the peak level of the TE signal to the amplifier 8.

Thus, the compensated TE signal which is supplied to the amplifier 8 has the signal waveform in which the amplitude was increased to the peak level of the TE signal in the off-track mode as shown in FIG. 3C.

When such a compensated TE signal is supplied to the equalizing amplifier 8, the information reading spot is strongly attracted in the disk radial direction by the circuits 8 and 9 and tracking mechanism 10 in the off-track mode and is moved toward the next track in the progressing direction.

As mentioned above, in the off-track mode, the amplitude of the TE signal is increased and the information reading spot is moved toward the nearest track according to the polarity of the amplitude so as to be locked to this track. Therefore, the pull-in force of the tracking servo increases and the information reading spot is rapidly shifted to the track to be traced, so that the so-called groove lock does not occur due to such a rapid pull-in.

Figure 4:
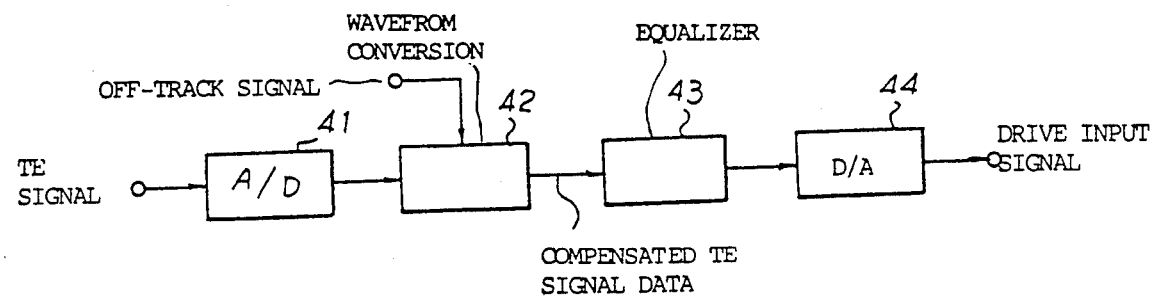
FIG. 4 is a block diagram showing a circuit arrangement in the case where the circuit of FIG. 1 is constructed by a digital processing circuit.

FIG. 4 shows an example in which the circuit comprising the components 2 to 4 and 8 shown in FIG. 1 is constructed by a digital circuit. Since the other construction is similar to that of the circuit shown in FIG. 1, its description is omitted.

The TE signal is sampled by an A/D converter 41 and the resultant Te signal data is supplied to a waveform converting circuit 42 comprising a microprocessor. On the other hand, the off-track signal is supplied to the waveform converting circuit 42. The waveform converting circuit 42 corresponds to level control means. By executing a signal processing program, which will be explained hereinafter, the waveform converting circuit 42 supplies the TE signal data to an equalizer arithmetic operating circuit 43 in the on-track mode. On the other hand, in the off-track mode, the waveform converting circuit 42 supplies that data whose absolute value is larger that the TE signal data to the equalizer arithmetic operating circuit 43. In the operating circuit 43, the same function as the equalizing amplifier 8 in FIG. 1 is realized by a digital circuit. The output data of the operating circuit 43 is converted into the drive input signal by a D/A converter 44 and is supplied to the driving circuit 9 in FIG. 1.

A signal process of the waveform converting circuit 42 will now be described with reference to a flowchart shown in FIG. 5.

Figure 5:
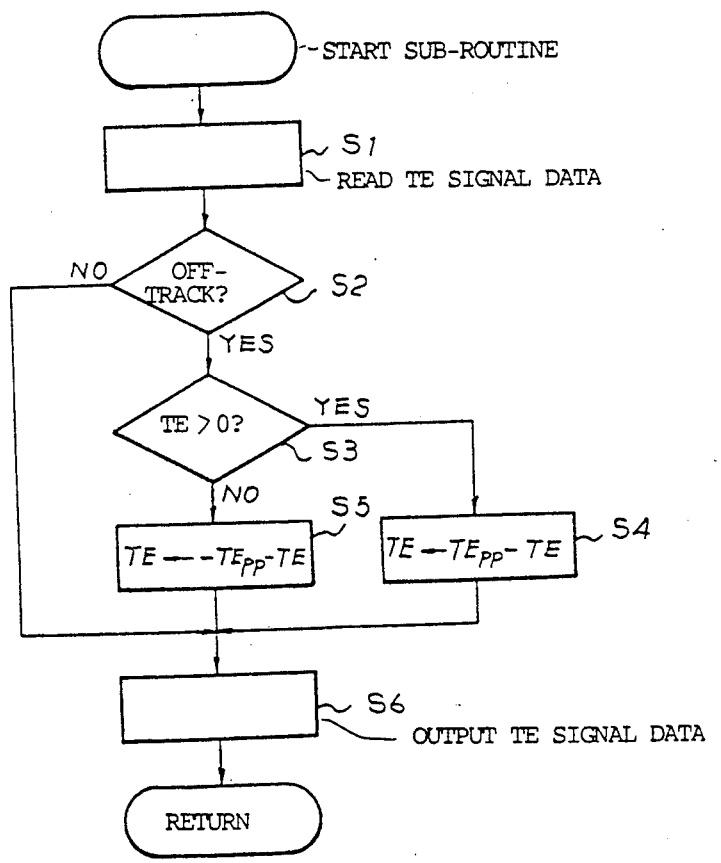
FIG. 5 is a flowchart showing a signal processing procedure, of a waveform converting circuit 42.

FIG. 5 shows a subroutine for the waveform converting process. When the microprocessor in the waveform converting circuit 42 reads a command to execute the subroutine in the main control program, The processing routine advances to the subroutine.

First, the TE signal data supplied from the A/D converter 41 is input to an arithmetic operating processing register (not shown) (step S1). Then a check is made to see if the tracking state is in the off-track mode or not (step S2) by checking the presence or absence of the off-track signal. When it is decided that the tracking state is in the off-track mode, a check is made to see if the TE signal data has a positive value or not in order to determine an increasing direction of the signal amplitude (step S3). When the TE signal data has the positive value, the TE signal data is subtracted form a mean value TEpp of the oscillation width (peak to peak value) of the TE signal which has previously been detected and stored by executing the subroutine (not shown) to detect the positive and negative peak levels (step S4). The result of the subtraction is supplied as compensated TE signal data to the equalizer arithmetic operating circuit 43 (step S6). When the TE signal data has the negative value, the TE signal data is subtracted from $-TE_{pp}$ (step S5) and the result of the subtraction is supplied as compensated TE signal data to the operating circuit 43 (step S6). If the tracking state has been decided to be the on-track mode in step S2, the processing routine directly advances to step S6 and the read TE signal data is supplied to the operating circuit 43. After such signal processes were executed, the processing routine is returned to the main control program and the execution of such a subroutine is again repeated.

FIG. 3D shows a signal waveform corresponding to the compensated TE signal data which is obtained by executing the above subroutine when the TE signal as shown in FIG. 3A is supplied to the A/D converter 41.

By executing the above subroutine, the sine wave TE signal is converted into a waveform similar to a sawtooth waveform and the signal level in the off-track mode increases.

As the mean value $TE_{pp}$ of the oscillation width (peak to peak value) of the TE signal, an estimated value is previously stored into a program or the like and can be also used in place of the mean value $TE_{pp}$.

In steps S4 and S5 of the above subroutine, a value larger than the TE signal data which is supplied can be also output. For instance, FIG. 3E shows an example of the case where $\pm TE_{pp}$ are output.

As mentioned above, when the information reading spot is out of the track due to an obstacle such as scratch or the like on the disk or when the spot exists between tracks at the time point when the tracking servo is started, the amplitude of the TE signal is amplified and the dynamic range of the TE signal is equivalently increased. The tracking mechanism is operated by a stronger force so as to rapidly attract the information reading spot to the track, so that the pull-in capability of the tracking servo is improved.

As a waveform of the compensated TE signal in the off-track mode, various waveforms larger than the inherent TE signal level can be used. The invention is not limited to the signal waveform shown in the embodiment.

It is also possible to construct the system such that the operation instructing circuit 7 generates the operation instruction signal when the level of the read RF signal largely decreases due to an obstacle or the like on the track.

Figure 6:
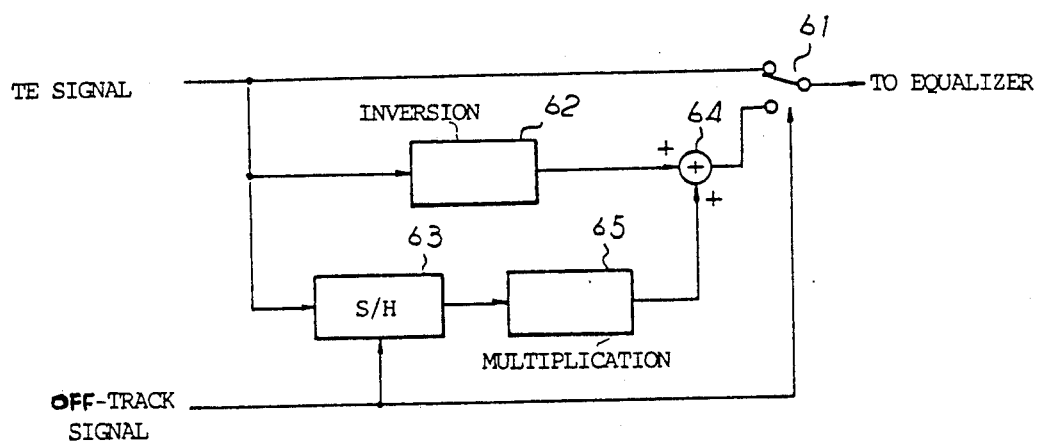
FIG. 6 is a block diagram showing another embodiment of the invention.

FIG. 6 is a block diagram showing another embodiment of the invention. In the diagram, the TE signal is supplied to one input terminal of a signal selecting switch 61 and is also supplied to an inverting circuit 62 and a sample and hold circuit 63. The TE signal whose polarity was inverted by the inverting circuit 62 is supplied to one input terminal of an adder 64. When the off-track signal is not supplied, the sample and hold circuit 63 directly outputs the TE signal level. When the off-track signal is supplied, the S/H circuit 63 holds the maximum level of the TE signal just before the supply of the off-track signal for only the period of time when the off-track signal is generated. The signal level of an output of the S/H circuit 63 is doubled by a multiplying circuit 65 and supplied to the other input terminal of the adder 64. An output of the adder 64 is supplied as a compensated TE signal to the other input terminal of the signal selecting switch 61. The switch 61 ordinarily selects the TE signal. When the off-track signal is supplied, the switch 61 selects the compensated TE signal from the adder 64.

The circuit shown in FIG. 6 can be also replaced by the waveform converting circuit 42 in FIG. 4 and can be constructed by a digital circuit.

Figure 7:
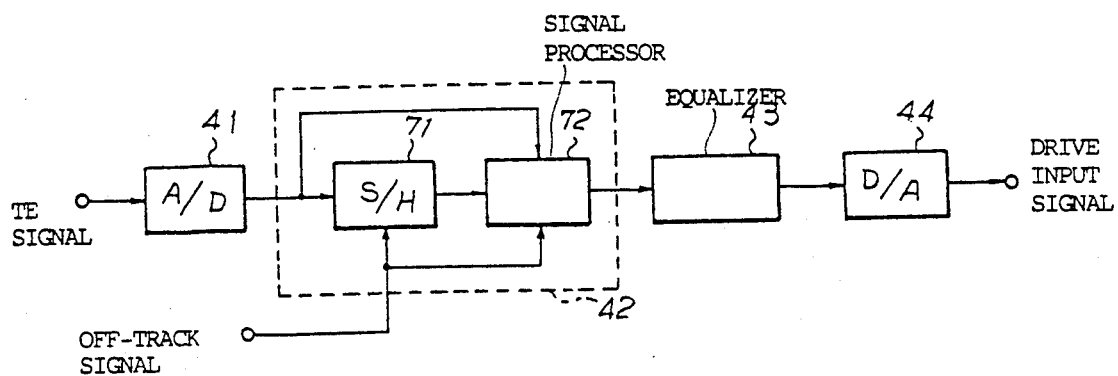
FIG. 7 is a block diagram showing a circuit arrangement in the case where the circuit of FIG. 6 is constructed by a digital processing circuit.

FIG. 7 shows an example in the case where the circuit of FIG. 6 is constructed by a digital circuit.

Figure 8:
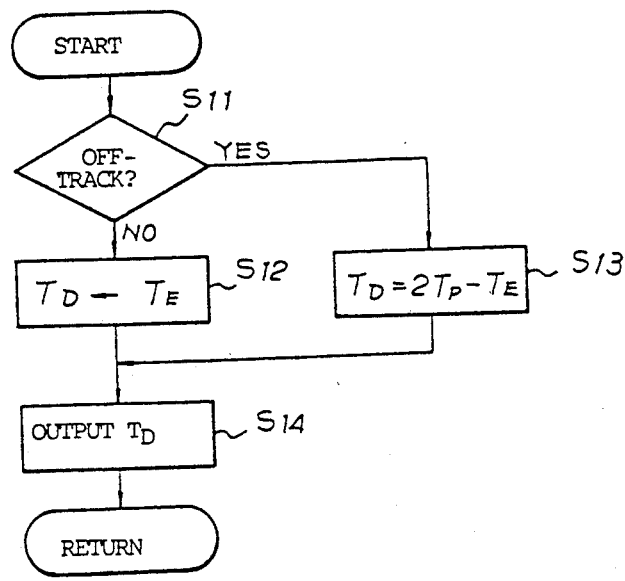
FIG. 8 is a flowchart showing a signal processing procedure for the circuit of FIG. 7.

FIG. 8 shows a flowchart to explain the operation of the circuits shown in FIGS. 6 and 7.

Although the circuit of FIG. 7 is fundamentally the same as the circuit construction of FIG. 4, the waveform converting circuit 42 includes a sample and hold (S/H) circuit 71 and a signal processor 72 for necessity of explanation. When the off-track signal does not exist, the S/H circuit 71 samples the input TE signal data and outputs. For the period of time when the off-track signal exists, the S/H circuit 71 holds the peak value of the TE signal data which was sampled just before the off-track signal is supplied and then outputs the peak value held. Both of the converted digital TE signal and an output of the S/H circuit 71 are input to the signal processor 72.

In the above construction, the waveform converting process which is executed by the signal processor 72 will now be described with reference to the flowchart of FIG. 8.

First, a check is made to see if the information reading spot exists at the on-track position or the off-track position on the basis of the off-track signal supplied (step S11). If the spot exists at the on-track position, the output of the S/H circuit 71 is directly used as compensated TE signal data $T_D$ (step S12). If the spot exists at the off-track position, since the S/H circuit 71 has held the TE signal data when the spot changed from the on-track to the off-track, an arithmetic operation of $2T_P - T_E$ is executed between a holding value $T_P$ as an output of the S/H circuit 71 and A/D converted TE signal data $T_E$ and the result of the calculation is used as the compensated TE signal data $T_D$ (step S13). The compensated TE signal data $T_D$ obtained by the above processing flow is output to the equalizer arithmetic operating circuit 43 (step S14).

Figure 9A:
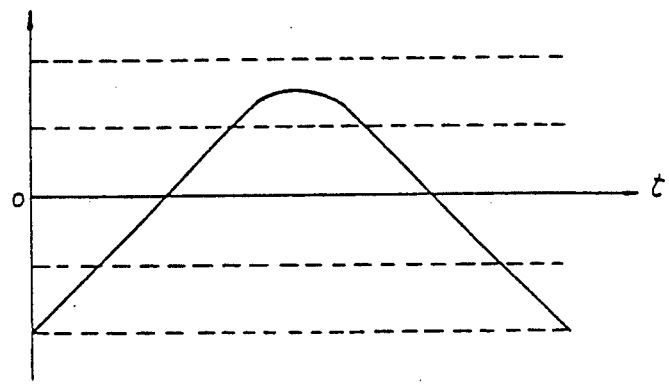
FIGS. 9A to 9D are operation waveform diagrams in the circuits shown in FIGS. 6 and 7.
Figure 9B:
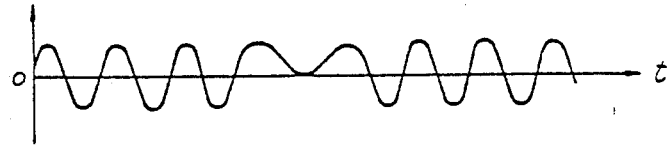
Figure 9C:
Figure 9D:
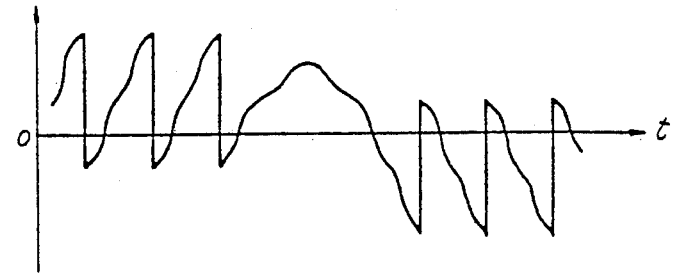

In FIG. 9, the compensated TE signal having such a waveform as shown in FIG. 9D is obtained for the relative position (FIG. 9A) between the track and the information reading spot by the waveform converting process described above. As will be also obvious from FIG. 9, the compensated TE signal (FIG. 9D) has a low frequency component of the polarity corresponding to the moving direction of the information reading spot. In general, the pickup actuator which is driven by the TE signal cannot follow at a high frequency because of the physical reasons. Therefore, in the case where the information reading spot has an initial velocity and the TE signal or the compensated TE signals as shown in FIGS. 3C to 3E have relatively high frequencies, the pickup actuator cannot follow such an error signal. However, since the compensated TE signal of FIG. 9D has the low frequency component in the error signal itself, the pickup actuator is also driven in the moving direction of the information reading spot by the low frequency component. Particularly when the open servo state is closed, a large effect is obtained. In FIG. 9A, a solid line indicates the center of an objective track and broken lines indicate the centers of the adjacent tracks, respectively. FIG. 9B shows the TE signal waveform. FIG. 9C shows the off-track signal waveform.

Figure 10:
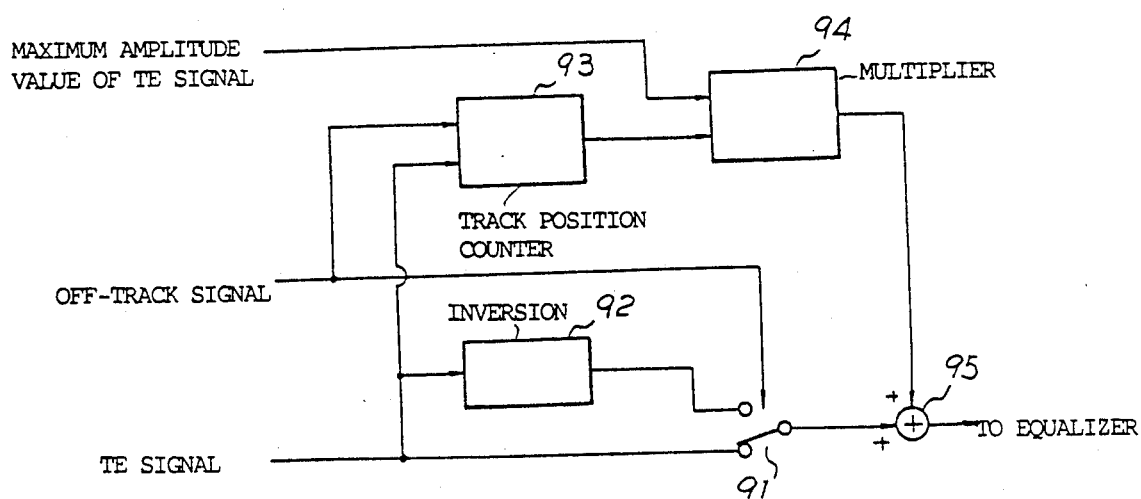
FIG. 10 is a block diagram showing further another embodiment of the invention.

FIG. 10 is a block diagram showing further another embodiment of the invention. The embodiment intends to provide a waveform conversion of the TE signal which is effective to precisely position the information reading spot onto the objective track in the searching operation. That is, to precisely trace the objective track, it is sufficient to set the TE signal level to 0 only on the objective track and to obtain the compensated TE signal having the polarity corresponding to the direction to the objective track and the level corresponding to the distance to the objective track in the case of the other tracks.

In the diagram, the TE signal is supplied to one input terminal of a signal selecting switch 91 and is also supplied to an inverting circuit 92 and a track position counter 93. The number of tracks from the present track position to the objective track is supplied to the track position counter 93 as an initial value having the polarity corresponding to the direction to the objective track. The TE signal whose polarity was inverted by the inverting circuit 92 is supplied to the other input terminal of the signal selecting switch 91. The switch 91 ordinarily selects the TE signal. When the off-track signal is supplied, the switch 91 selects the TE signal whose polarity was inverted by the inverting circuit 92. The maximum amplitude value of the TE signal is supplied to the multiplier 94. The maximum amplitude value is multiplied to the count value of the counter 93 by the amplifier 94. The maximum amplitude value of the TE signal denotes an absolute value of a peak value of the TE signal. The maximum amplitude value of the TE signal is, for instance, manually set by setting means (not shown) or automatically set by a circuit (not shown) to obtain the mean value of the TE signals which have previously been obtained.

The track position counter 93 receives the off-track signal as a count control input. The counter 93 counts up when the TE signal level is positive and the tracking state changes from the on-track mode to the off-track mode and when the TE signal level is negative and the tracking state changes from the off-track mode to the on-track mode. On the contrary, the counter 93 counts down when the TE signal level is positive and the tracking state changes from the off-track mode to the on-track mode and when the TE signal level is negative and the tracking state changes from the on-track mode to the off-track mode. The count value of the counter 93 corresponds to the distance from the objective track to the present track. A multiplication output of a multipier 94 is added to the TE signal or its polarity inverted signal by an adder 95 and the result of the addition becomes a waveform conversion output.

The circuit shown in FIG. 10 can be also replaced by the waveform converting circuit 42 in FIG. 4 in a manner similar to the circuit of FIG. 6 and can be constructed by a digital circuit.

Figure 11:
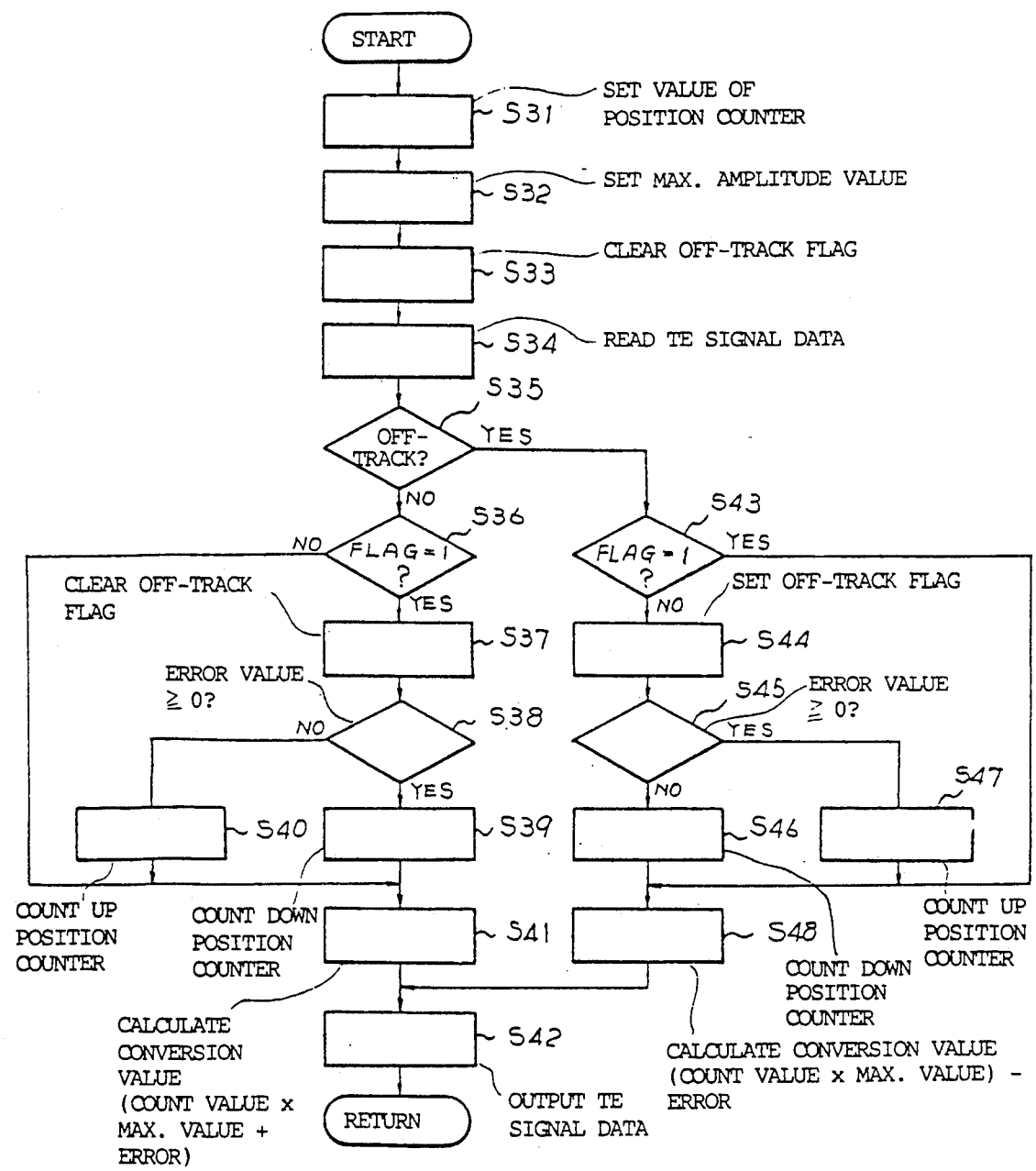
FIG. 11 is a flowchart showing a signal processing procedure in the case where the circuit of FIG. 10 is constructed by a digital processing circuit.

A procedure for the waveform converting process in FIG. 10 which is executed by the microprocessor in the case where the circuit of FIG. 10 is constructed by a digital circuit will now be described with reference to a flowchart of FIG. 11.

First, the initialization in steps S31 to S33 is executed at the start of the searching operation of the like. That is, the value of a position counter corresponding to the track position counter 93 is set to the value which is twice as large as the track difference between the objective track and the present track (step S31). Then, the maximum value of the amplitude of the TE signal is set (step S32). Further, an off-track flag is cleared (step S33). Subsequently, the TE signal data is read (step S34). A check is made to see if the spot exists at the off-track position or not by checking the presence or absence of the off-track signal (step S35).

If the spot exists at the on-track position, a check is made to see if the off-track flag has been set (FLAG=1) or not (step S36). If YES, the off-track flag is reset (step S37) and a check is made to see if the read TE signal data is positive or not (step S38). If the TE signal data is positive, the position counter is counted down (step S39). If the TE signal data is negative, the position counter is counted up (step S40). The count value of the position counter and the maximum amplitude value of the TE signal are multiplied and the TE signal is added to the multiplied value, thereby obtaining the conversion value of the TE signal (step S41). The conversion value is output as the TE signal (step S42). If it is decided that the off-track flag is not set in step S36, the processing routine directly advances to step S41.

On the other hand, if the spot exists at the off-track position in step S35, a check is made to see if the off-track flag has been set (FLAG=1) or not (step S43). If NO, the off-track flag is set (step S44). A check is then made to see if the read TE signal data is positive or not (step S45). If the TE signal data is negative, the position counter is counted down (step S46). If it is positive, the position counter is counted up (step S47). The count value of the position counter and the maximum amplitude value of the TE signal are multiplied and the TE signal is subtracted from the multiplied value thereby obtaining the conversion value of the TE signal (step S48). The conversion value is output as the TE signal (step S42). If the off-track flag has been set in step S43, the processing routine directly advances to step S48.

In FIG. 12, the compensated TE signal having such a waveform as shown in FIG. 12E is obtained for the relative position (FIG. 12A) between the track and the information reading spot by the waveform converting process described above. That is, since the value which is almost proportional to the distance form the objective track can be obtained as the compensated TE signal (FIG. 12E), the pull-in operation can be easily executed and the pull-in performance can be improved. In FIG. 12A, a solid line indicates the center of the objective track and broken lines represent the centers of the adjacent tracks, respectively, FIG. 12B shows a TE signal waveform. FIG. 12C shows the off-track signal waveform. FIG. 12D shows the count value of the position counter.

The above waveform converted compensated TE signal is also effective in the still image reproducing mode in a CAV (constant angular velocity) disk. In the CAV disk, image information of one television frame is recorded per revolution of the disk. By repetitively reproducing the image information from the track, a still image can be reproduced. If the laser beam skipped from this track to another track due to the disturbance, by counting the number of tracks which were traversed by the information reading spot and supplying the count value to the track position counter, the spot can be precisely returned to the track from which a still image has be reproduced. In the CAV disk, since the frame number corresponds to the track, it is also possible to construct the system such that the number of traversed tracks is not counted but the frame number of the track from which a still image has been reproduced and the frame number of the track to which the spot has been jumped are compared and the difference between those numbers is used as a count value.

As described above, in the tracking servo apparatus of the invention, when the information reading spot does not exist on the track, the amplitude of the tracking error signal is increased to a level greater than the inherent signal level and the dynamic range is enlarged, thereby generating the strong pull-in force. Therefore, since the pull-in operation can be rapidly executed, the groove lock phenomenon is avoided.

What is claimed is:

1. A tracking servo apparatus having tracking error signal generating means for generating a tracking error signal according to a deviation amount of an information reading spot of a pickup from a recording track in a radial direction of an information recording disk and driving means for driving said information reading spot in the disk radial direction so as to suppress the deviation between the information reading spot and the recording track on the basis of said tracking error signal, the tracking servo apparatus further comprising:
   off-track detecting means for detecting whether the information reading spot impinges on the recording track and for generating an off-track signal indicative of a state in which the information reading spot is not on the recording track; and
   level control means for increasing an amplitude of the tracking error signal in response to the off-track signal wherein said level control means has holding means for holding a level of said tracking error signal at the instant of time that the off-track signal is generated and outputs the level held in said holding means in response to the off-track signal.

2. A tracking servo apparatus having tracking error signal generating means for generating a tracking error signal according to a deviation amount of an information reading spot of a pickup from a recording track in a radial direction of an information recording disk and driving means for driving said information reading spot in the disk radial direction so as to suppress the deviation between the information reading spot form (OR FROM) the recording track on the basis of said tracking error signal, the tracking servo apparatus further comprising:
   off-track detecting means for detecting whether the information reading spot impinges on the recording track and for generating an off-track signal indicative of a deviation of the information reading spot from the recording track;
   holding means for holding a level of said tracking error signal at the instant of time that the the off-track signal is generated; and
   level increasing means for generating a compensated error signal having the same polarity as that of said level held by said holding means and having a level larger than the absolute value level of said level held by said holding means, said level increasing means applying said compensated error signal or said tracking error signal to said driving means such that said compensated error signal is applied to said driving means in response to the off-track signal and otherwise said tracking error signal is applied to said driving means.

3. A tracking servo apparatus having tracking error signal generating means for generating a tracking error signal according to a deviation amount of an information reading spot of a pickup from a recording track in a radial direction of an information recording disk and driving means for driving said information reading spot in the disk radial direction so as to suppress the deviation between the information reading spot and the recording track on the basis of said tracking error signal, the tracking servo apparatus further comprising:
   means for obtaining distance information and direction information of the present track which the information reading spot is tracking from a target track to which the reading spot is to be moved; and
   level increasing means for forcing said tracking error signal to have the same polarity represented by said direction information and a level represented by said distance information to effectively generate a compensated tracking error signal and for applying the compensated tracking error signal to said driving means.

4. A tracking servo apparatus for controlling the location of an information reading spot of a pickup on an information recording disk comprising:
   tracking error signal generating means for generating a tracking error signal according to an amount of deviation of an information reading spot of a pickup from a recording track in a radial direction on an information recording disk;
   driving means for driving said information reading spot in a radial direction across the disc so as to suppress the deviation of the information reading spot from the recording track on the basis of said tracking error signal;
   off-track detection means for detecting whether the information reading spot impinges on the recording track and generating as output an high level off track signal and a low level on track signal, the high level off track signal being indicative of a deviation of the information reading spot from the recording track and the low level on track signal being indicative of said information reading spot properly impinging said recording track;
   signal relay switch receiving as input said tracking error signal and supplying as output said tracking error signal in response to said low level on track signal and not supplying as output said tracking error signal in response to said high level off track signal;
   sample and hold means receiving as input the output of said signal relay switch for generating as output the maximum value of the tracking error signal just prior to said off-track detection means detecting that said information reading spot has gone off track;
   operation instruction means including control means for generating an instruction to enlarge the dynamic range of said tracking error signal, and being responsive to said instruction to generate as output a high level operation instruction signal;

logic gate means receiving as input the output of said off-track detection means and said operation instruction means and generating as output a high level selection signal in response to the concurrence of the operation instruction signal and the high level off track signal and otherwise generating a low level selection signal; and signal selecting switch receiving as input said tracking error signal and the output of said sample and hold means and having an output terminal connected as input to the driving means, said signal selecting switch being connected to said logic gate means and responsive to said high level selection signal for connecting said output of said sample and hold means as input to said driving means and being responsive to said low level selection signal for connecting said tracking error signal as input to said driving means to thereby supply the tracking error signal to said driving means when the reading spot is on track and to supply the maximum value of the tracking error signal just prior to off track to the driving means.

5. A tracking servo apparatus for controlling the location of an information reading spot of a pickup on an information recording disk comprising:

tracking error signal generating means for generating a tracking error signal according to an amount of deviation of an information reading spot of a pickup from a recording track in a radial direction on an information recording disk;

driving means for driving said information reading spot in a radial direction across the disc so as to suppress the deviation of the information reading spot from the recording track on the basis of said tracking error signal;

off-track detection means for detecting whether the information reading spot impinges on the recording track and generating as output an off track signal being indicative of a deviation of the information reading spot from the recording track;

signal inverting means receiving as input said tracking error signal and generating as output an inverted version of said tracking error signal having a polarity opposite to the input tracking error signal;

sample and hold means receiving said tracking error signal and being controlled by said off track signal so as to supply as output said tracking error signal in the absence of said off track signal and to supply as output an instantaneous maximum level of said tracking error signal just prior to the occurrence of said off track signal and for the duration of the presence of said off track signal;

multiplication means receiving as input the output of said sample and hold means for generating an output signal having a level double of that of the output of said sample and hold means;

adding means receiving as input the output of said inverting means and the output of said multiplication means and generating as output the sum of the output of said output of said multiplication means and the output of said signal inverting means; and signal selecting switch receiving as input said tracking error signal and the output of said adding means and having an output terminal connected as input to the driving means, said signal selecting switch being responsive to said off track signal for connecting said output of said adding means as input to said driving means upon the presence of said off track signal and for connecting said tracking error signal as input to said driving means upon the absence of said off track signal to thereby supply the tracking error signal to said driving means when the reading spot is on track and to supply the maximum value of the tracking error signal just prior to off track to the driving means.

6. A tracking servo apparatus for controlling the location of an information reading spot of a pickup on an information recording disk comprising:

tracking error signal generating means for generating a tracking error signal according to an amount of deviation of an information reading spot of a pickup from a recording track in a radial direction on an information recording disk;

driving means for driving said information reading spot in a radial direction across the disc so as to suppress the deviation of the information reading spot from the recording track on the basis of said tracking error signal;

off-track detection means for detecting whether the information reading spot impinges on the recording track and generating as output an off track signal being indicative of a deviation of the information reading spot from the recording track;

track position counter means for storing the number of tracks and direction to a desired track from a present track which the information reading spot is desired to be moved, said track position counter receiving the off track signal and the tracking error signal as count control inputs for counting up when the tracking error signal is positive and a tracking state of said reading spot changes from on track to off track and when the tracking error signal is negative and the tracking state of said reading spot changes from off track to on track according to the presence or absence of said off track signal, and counting down when the tracking error signal is positive and the tracking state changes from off track to on track and when the tracking error signal is negative and the tracking state changes from on track to off track;

signal inverting means receiving as input said tracking error signal and generating as output an inverted version of said tracking error signal having a polarity opposite to the tracking error signal supplied as input;

signal selecting means receiving as input said tracking error signal and the output of said signal inverting means and being responsive to said off track signal so as to supply as output the tracking error signal in the absence of said off track signal and to supply as output the output of said signal inverting means upon the presence of said off track signal;

multiplying means receiving as input a predetermined maximum value of the tracking error signal and an output of said track position counter means and generating as output the predetermined maximum value multiplied by a number corresponding to the output of said track position counter means;

adding means receiving the output of said signal selecting means and the output of said multiplying means for generating as output the sum of the output from said multiplying means and the output of said signal selecting means, the output of said adding means being supplied as input to said driving means.

* * * * *